Figure 1:
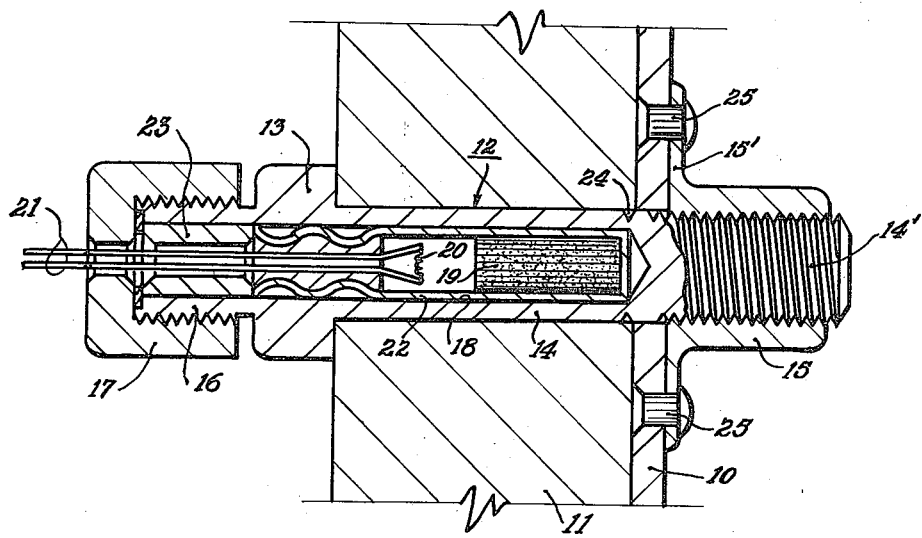

Sept. 29, 1953　　　T. C. SMITH　　　2,653,504
EXPLOSIVELY SEVERABLE BOLT
Filed March 20, 1950

INVENTOR
THOMAS C. SMITH
BY
Carlton B. Pritchett
AGENT

Patented Sept. 29, 1953

2,653,504

UNITED STATES PATENT OFFICE 2,653,504

EXPLOSIVELY SEVERABLE BOLT

Thomas C. Smith, Poughkeepsie, N. Y., assignor, by mesne assignments, to the United States of America as represented by the Secretary of the Navy Application March 20, 1950, Serial No. 150,665

1 Claim. (Cl. 85—1)

This invention relates generally to severable mechanical fastening and/or bonding devices, and more particularly to a bonding device which is severable by the deflagration of a small quantity of highly combustible material contained within the body of the device.

The device, when used as a mechanical bond to join two or more material parts in a fixed relation, enables the same to be quickly detached. In order to obtain the full advantage of the use of such a device, it is preferable that the severing of the bond takes place under tension at or within a predetermined area of the device.

Accordingly, it is an object of the invention to provide a mechanical bonding device which is severable within a predetermined area of the body of the device in response to tension forces developed through the deflagration of a self-contained charge of highly combustible material.

It is another object of the invention to provide a mechanical fastening or bonding device of the class above described which is comprised of a minimum number of component parts, each of which, in turn, will be easy and inexpensive to manufacture and assemble.

It is a feature of the invention to provide means whereby the deflagration of the self-contained combustible material is initiated in response to a supervisory control arranged outside of the body proper of the device. In the form of the invention herein disclosed the control is exercised by the completion of an electrical circuit by the human element or an automatically operated electric circuit closing means. Examples of this latter type of control include a mechanical and/or electrical stress and/or strain responsive arrangement, an automatic instrumentation arrangement, a radio or radar responsive arrangement, an optical, acoustical and/or heat responsive arrangement, or a combination of two or more of these arrangements.

Accordingly, it is another feature of the invention that the means for initiating the deflagration of the self-contained combustible material is adapted to be included in an electrical circuit.

Another feature of the invention resides in the provision of a sealing means for the cavity in the body of the device within which the combustible material is placed whereby the pressure created upon the initiation of the deflagration is maintained substantially within the cavity. By the use of the sealing means, the minimum amount of combustible material required to sever the mechanical bond effected by the device may be used, thus greatly enhancing the safety of the device.

The severable bonding device according to this invention which is more particularly set forth hereinafter, is shown and described in the general form of a nut and bolt. It will be understood, however, that the showing is for illustrative purposes only and not by way of limitation within the scope of the appended claim.

A severable bonding device according to this invention has a body part which is hollow for a substantial portion of its length and has the cavity thus formed opening through one end of the body. A quantity of highly combustible material and, in close proximity thereto, an electrically operable bridge wire for initiating the deflagration of the material, are placed within the body cavity. A sealing means having sufficient ductility to be deformable is arranged over the open end of the cavity and a cap affixed to that end of the body, or an extension thereof, whereby the cavity is effectively closed. The wires for connecting the initiating means to the electrically operable control circuit extend from within the cavity, through the open end thereof and through a small hole in the seal. If the device is to be operated by a remotely located supervisory control, the wires are passed through a small hole in the cap also.

Each of the ends of the body is adapted to be secured to one of the plurality of material parts which it is desired to fasten together in a fixed relation. The body of the device is weakened materially at the area within which it is desired the severing shall take place in a manner more particularly set forth hereinafter. It will be understood, however, that the weakened area shall retain sufficient strength to enable the bonding device to function under all normal conditions as a fastening element for the material parts.

When it is desired to sever the bonding device and free the material parts held in a fixed relation thereby, the electrically operable bridge wire for initiating the deflagration is activated by the supervisory control. In the deflagration of the combustible material which follows, the heat and pressure generated within the cavity deforms and forces the material comprising the seal into the remaining space in the openings through which the electrical initiating circuit wires leading from within the cavty pass. With this escape path effectively closed, the heat and pressure within the cavity due to the continuing deflagration build up until the physical tensile strength characteristics of the device at its weakened area are exceeded. As a result, the body of the device is fractured and the material parts are freed of each other.

Figure 2:
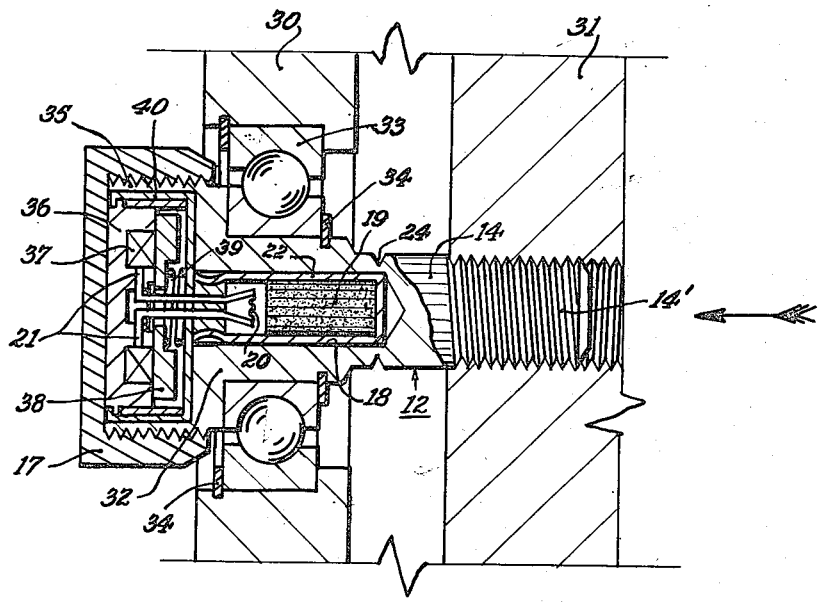

For a more complete and detailed understanding of the invention, reference may be had to the accompanying drawing, in which:

Figure 1 is a cross-sectional view of one form of a severable mechanical bond according to the invention; and Figure 2 is a cross-sectional view of a modified form of the invention in which the supervisory control arrangement is affixed to and forms an extension part on one end of the device.

In the drawing, wherein like parts of the figures are designated by the same reference numeral, 10 and 11 represent a portion of material parts, for example, a bulkhead and spar of an airplane fuselage and wing respectively, which it is desired to maintain in a fixed relation under all normal circumstances, but which, should an occasion arise, it is desired to detach quickly from each other. As has been before noted, the invention is herein described and shown as having a bolt-like form in which the body portion is designated generally at 12. The body has a head 13 and a shank 14 adapted at its working end 14' to receive a nut 15. Beyond the head 13 there is an axial extension 16 adapted to receive a closure cap 17. A cavity 18 is formed within the body of the device and the extension 16 thereof.

A quantity of highly combustible material 19 and an electrically operable bridge wire 20 for initiating the deflagration thereof are arranged within the cavity 18. The electrical circuit wires 21 for connecting the bridge wire 20 to a supervisory control circuit (not shown) are led out from the cavity through the open end thereof. For convenience and ease of assembly, it is contemplated that the combustible material and the bridge wire together with the connecting wires 21 attached thereto may be sub-assembled within a separate container 22. Such an arrangement is shown in Patent No. 2,476,370, issued July 19, 1949, to E. J. Hanley.

It is important, however, that a combustible material be used which has a definite and known speed of burning characteristic, and that it be used only in such a quantity that sufficient tensile forces will be obtained to incur the fracture of the body. Any excess force which would be generated by an appreciable excess of the necessary amount of combustible material should be avoided for safety reasons.

A seal-forming member 23 in the form of a collar is provided within that portion of cavity 18 between the end of extension 16 adjacent nut 13 and the underside of cap 17. In the preferred construction, the seal 23 is formed from almost pure aluminum. Such a material has sufficient ductility to be deformed by the heat and pressure created as a result of the deflagration of the combustible material and forced into any exit path leading from within the cavity 18, such as the space surrounding wires 21 where they pass through a small hole in the seal 23 and the cap 17.

In the embodiment of the invention herein disclosed, the body of the device is weakened by a peripheral notch as shown at 24. It is preferable that the same be located on the shank 14 and adjacent the common surface between the material parts in an arrangement in which those parts are normally held against each in compression by the device. This specific location of the notch, however, is not necessary, but experience has shown that some damage may be incurred by the material parts upon the fracture of the device if the weakened area of the same does not bear the above-described relation to the common surface between the material parts. It is preferable also to make the depth of the cavity 18 within the shank 14 such that the bottom thereof is in a plane substantially normal to the axial length of the cavity and through or somewhat beyond the notch 24. However, according to well known physical laws, if the notch 24 is placed anywhere along the length of the cavity 18, a satisfactory fracture of the device will be obtained.

If one of the material parts to be held in fixed relation by the device, for instance part 11, should be in a "blind" area in the final assembly of the contrivance with which it is to be used, the nut 15 may be provided with a flange 15' which, in turn, may be fastened to the part 11 prior to final assembly by means of rivets 25 extending through aligned holes in part 11 and flange 15' of the nut 15.

With the material parts 10 and 11 and the device according to the invention assembled as shown in Figure 1, the operation of any of the types of supervisory control heretofore mentioned completes an electrical circuit (not shown), including a source of electrical energy, through wires 21 thereby effecting an energization of the bridge wire 20 and the resulting deflagration of the highly combustible material 19. The heat and pressure thus generated within cavity 18 causes the aluminum seal 23 to deform and forces the same to flow into and fill the spaces within the hole in cap 17 through which the wires 21 pass, thus effectively sealing the same. With this exit path closed, the heat and pressure due to the continuing deflagration of the combustible material 19 builds up until the tensile strength characteristic of the device at its weakest part (the cross-sectional area at the notch 24) is exceeded and the device fractures. As will be seen from the drawing, when the device is fractured, the material parts 10 and 11 will no longer be held together by the mechanical bond originally effected by the device.

In a modified form of the invention as shown in Fig. 2, the supervisory control is affixed to the device externally of the body proper thereof and is in the form of a magneto arranged in an extension part thereof. The magneto is operable in response to a shock in one direction exerted axially of the device and is adapted to generate an electric current suitable for the energization of the bridge wire. The arrangement according to Fig. 2 further illustrates the versatility of the device and the ease with which it may be adapted to various particular uses. In this arrangement, the material parts are held in a fixed relation axially but one of the parts is free to rotate relative to the other. Such an arrangement may be used conveniently, for example, in parachuting articles from an airplane in order to free the article from the chute when the article contacts the ground or other rigid and/or substantial object.

In the arrangement according to Fig. 2, portions of the material parts are indicated at 30 and 31. In the above suggested use, part 31 represents a portion of the article being suspended by the chute (not shown) and part 30 represents a ring-like part of the chute (not shown) to which the shroud lines therefore are attached. The body of the device, generally indicated at 12, is represented in the form of a bolt having a head 32 and a shank 14. The working end 14' of the shank is adapted to be secured to the material part 31. The head 32 is adapted to be rotatably secured to the material part 30 through the medium of a bearing 33 held in place, for example, by snap rings 34. Beyond the head 32, there is a hollow axial extension 35 having a diameter substantially in excess of the head. The open end of the extension is covered by a cap 17. The body of the device is hollow for a substantial portion of its length and the cavity 18 thus formed accommodates a quantity of highly combustible material 19 and an electrically operable deflagration initiating means therefor in the form of a bridge wire 20 together with the wires 21 whereby the bridge wire is energized. As has been previously explained, these latter elements may be arranged in a container 22 for convenience and ease of assembly of the device. The body of the device is weakened by a peripheral notch 24, the preferred location and depth of which already has been described with regard to Fig. 1.

The magneto, which is used in this form of the invention as a supervisory control, is arranged within the enlarged diameter, hollow axial extension 35 which is beyond the body proper of the device. The magneto is comprised of a base or frame 36 of highly permeable material, a field coil 37 to which wires 21 leading from the bridge wire 20 are attached, and a washer type permanent magnet armature 38 which is biased axially of the device by a spring 39. For ease and convenience of assembly, it is preferred that the magneto parts be sub-assembled in a casing 40, and that the connections for wires 21 to the coil 37 be of the prong and socket type commonly used for vacuum tubes. Such details, however, form no part of this invention, and accordingly, are not shown in detail in the drawing. The casing 40 may be made of a deformable non-magnetic material such as almost pure aluminum and thus form a seal between the walls of extension 35 and cap 17 during the deflagration period in a manner heretofore described with regard to the seal 23 of Fig. 1.

In the arrangement of the device as shown in Fig. 2, the armature 38 is held against the coil 37 by spring 39. Accordingly, any physical shock exerted axially of the device in the direction indicated by the arrow, will move the armature 38 away from coil 37 thereby producing an electric current therein which is conducted via the wires 21 to energize the bridge wire 20. In the deflagration of the combustible material 19 which follows, the heat and pressure generated within cavity 18 bring about the sealing of the cavity through the deformation of the case 40 and, thereafter, the fracture of the device at the weakened area 24, thus freeing, in the exemplary use heretofore mentioned, the part 30 attached by shroud lines to the parachute from the part 31 attached to or forming part of the article suspended by the chute.

While the invention has been shown and described in detail with regard to two embodiments thereof, it is to be understood, however, that the invention is not limited to the precise construction here shown, the same being illustrative of the principles of the invention. What is considered new and desired to be secured by Letters Patent is:

In a mechanical fastening device for joining at least two material parts in a precise relation and in which the device is severable through tensile forces developed by the deflagration of combustible material, the combination comprising a partially hollow elongate body open at one end and having a threaded solid shank at the other end thereof, external threading on said body adjacent the open end thereof, a head integral with said body and spaced from the open end thereof by said external threading, a wall defining the hollow portion of said body between said head and said solid shank, said wall having a uniform cross-sectional area and uniform tensile strength characteristics, an external peripheral notch in said wall in a plane substantially normal to the longitudinal axis of the body, the notched portion of the wall having a reduced cross-sectional area and therefore having substantially lower tensile strength characteristics than the uniform cross-sectional area of said wall, a closure cap threaded over the open end of said body on said external threading, means defining an axial passageway through said closure cap, a deformable tubular seal-forming member located within the open end of the body, a quantity of highly combustible material having a definite and known speed of burning within the hollow portion of said body defined by said wall, an electrically operated bridge wire within said hollow body in close proximity to said combustible material for initiating the deflagration of said combustible material, electrical conductors connected to said bridge wire and extending from within said hollow body through said tubular seal-forming member and the passageway in said closure cap, there being space between said electrical conductors and said means defining said axial passageway, said conductors being adapted to be connected to a supervisory control including a source of electrical energy, and said deformable tubular seal-forming member being responsive to the heat and pressure caused by the deflagration of said combustible material to flow into and close said space in said axial passageway.

THOMAS C. SMITH.

References Cited in the file of this patent

UNITED STATES PATENTS

| Number | Name | Date |
|---|---|---|
| 384,662 | Zalinski | June 19, 1888 |
| 1,400,401 | Allan | Dec. 13, 1921 |
| 2,064,503 | Temple | Dec. 15, 1936 |
| 2,250,056 | Alexander | July 22, 1941 |
| 2,476,370 | Hanley | July 19, 1949 |

FOREIGN PATENTS

| Number | Country | Date |
|---|---|---|
| 694,019 | Germany | June 27, 1940 |
| 875,292 | France | Sept. 14, 1942 |